United States Patent
Yamazaki

(10) Patent No.: US 7,633,645 B2
(45) Date of Patent: Dec. 15, 2009

(54) HARD COPY PRODUCING METHOD, HARD COPY PRODUCING DEVICE, AND HARD COPY

(75) Inventor: Yoshirou Yamazaki, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 1227 days.

(21) Appl. No.: 10/900,363

(22) Filed: Jul. 28, 2004

(65) Prior Publication Data

US 2005/0024659 A1 Feb. 3, 2005

(30) Foreign Application Priority Data

Jul. 29, 2003 (JP) ............... 2003-202845

(51) Int. Cl.
H04N 1/60 (2006.01)
(52) U.S. Cl. .................. 358/1.9; 358/2.1
(58) Field of Classification Search .......... 358/1.9, 358/2.4
See application file for complete search history.

(56) References Cited

U.S. PATENT DOCUMENTS

| | | | |
|---|---|---|---|
| 5,585,841 A * | 12/1996 | Hardin | 348/163 |
| 6,934,057 B1 * | 8/2005 | Namizuka | 358/2.1 |
| 7,339,702 B2 * | 3/2008 | Akita et al. | 358/1.9 |
| 2003/0095269 A1 * | 5/2003 | Kubo et al. | 358/1.9 |
| 2003/0202214 A1 * | 10/2003 | Akita et al. | 358/3.24 |

FOREIGN PATENT DOCUMENTS

| | | |
|---|---|---|
| JP | 3-190778 | 8/1991 |
| JP | 8-39841 | 2/1996 |
| JP | 2000-000988 | 1/2000 |

OTHER PUBLICATIONS

Japanese Office Action dated Jan. 17, 2006, with partial English translation.

* cited by examiner

Primary Examiner—Twyler L Haskins
Assistant Examiner—David L Suazo
(74) Attorney, Agent, or Firm—Whitham Curtis Christofferson & Cook, PC

(57) ABSTRACT

A hard copy is produced by steps of recording an image on a recording medium according to an image signal which represents an image density of the image to be recorded; applying a surface roughness control to an image area on the recording medium on which the image is recorded; and correcting, before recording the image on the recording medium, the image signal used for the recording so that a viewed image density provided after the surface roughness control equals the image density of the image to be recorded, using information on a density difference between an image density before the surface roughness control and an viewed image density after the surface roughness control.

12 Claims, 7 Drawing Sheets

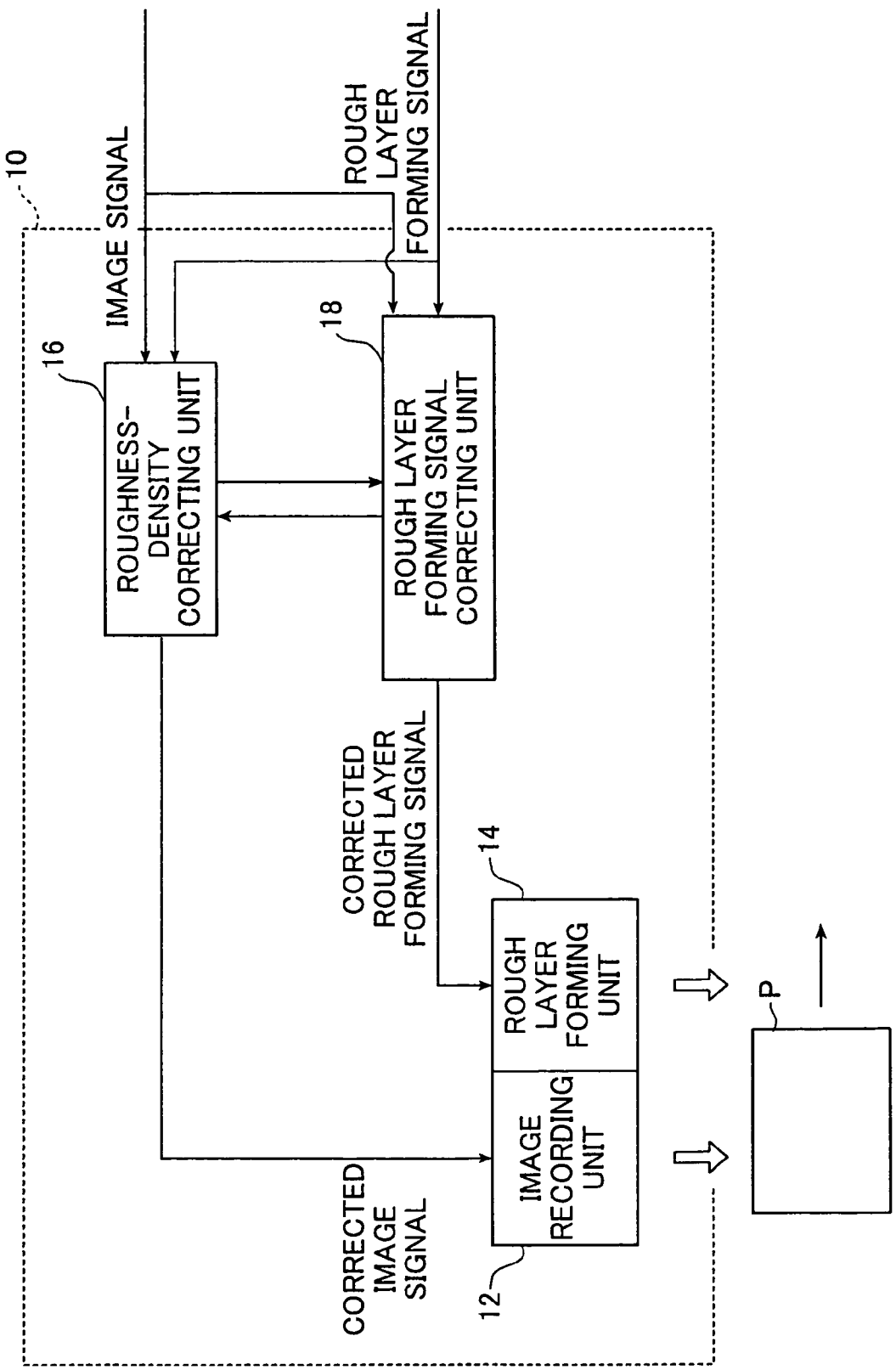

HARD COPY PRODUCING METHOD, HARD COPY PRODUCING DEVICE, AND HARD COPY

BACKGROUND OF THE INVENTION

The present invention belongs to a technical field of hard copies such as photographic prints and printed sheets. In particular, the present invention relates to a hard copy producing method and a hard copy producing device capable of providing a high-quality hard copy suitably expressing image texture, three-dimensionality, and so on, and a hard copy.

Various proposals have been made to improve textural expression of photographic prints, prints produced by a variety of printers, etc., so as to produce highly value-added products.

For example, JP 3-190778 A discloses a thermal printer device using a transfer sheet with sublimable dye applied thereon, which records an image by re-heating the image through an area formed on the transfer sheet with a material different from the sublimable dye such that the image becomes desirably glossy or matte.

Also, JP 8-39841 A discloses a method of producing prints with a thermal transfer printing device, where an object is photographed under two conditions, with a large amount of light reflection and a small amount of light reflection, and a signal obtained with small light reflection is subtracted from a signal obtained with large light reflection to generate a gloss signal. Also, a print is produced with an image signal generated by photographing the object with the same image pickup means and the produced print is re-heated according to the gloss signal, whereby the gloss can be expressed at will in conformity with the glossiness of the printed image.

The two techniques both produce higher-quality prints by processing the print surface to provide it with glossiness and non-glossiness in conformity with the image. However, a change of print surface properties causes light reflection characteristics to vary, which varies a viewed image density, or an apparent image density.

Therefore, the viewed image color/density differs from that of the original image, resulting in adverse effects such as quality deterioration and unnaturalness of the image. Thus, though the textural expression of the image is improved, the image quality may be deteriorated.

SUMMARY OF THE INVENTION

The present invention has been made to solve the above-mentioned problems of the conventional techniques, and concerning hard copies such as photographic prints and printed sheets, an object of the present invention is to provide a high-quality hard copy producing method and device and a hard copy produced thereby which suitably expresses glossiness and non-glossiness, texture of materials of objects, e.g., cloth or paper, in the image, three-dimensionality of objects, the depth of the image, and so on, and which offers an adequate viewed image density.

The invention provides a hard copy producing method for producing a hard copy by recording an image on a recording medium according to an image signal which represents an image density of the image to be recorded, comprising the steps of: recording the image on the recording medium according to the image signal; applying a surface roughness control to an image area on the recording medium on which the image is recorded; and correcting, before recording the image on the recording medium, the image signal used for the recording so that a viewed image density provided after the surface roughness control equals the image density of the image to be recorded, using information on a density difference between an image density before the surface roughness control and an viewed image density after the surface roughness control.

In the correction of the image signal, provided that the image density of the image to be recorded is denoted by $Di$, an index indicating a degree of the surface roughness is denoted by $S$, the viewed image density after the surface roughness control is denoted by $Density(Di, S)$, and $[Density(Di, S)-Di]$ is denoted by $Ds(Di, S)$, an image density $Dx$ that satisfies $[Di=Dx+Ds(Dx, S)]$ can be obtained and the image signal can be corrected so as to record the image on the recording medium with the image density $Dx$.

It is preferable that the invention further comprises the step of adjusting the surface roughness control so that the image signal corrected according to the surface roughness control represents an image density within a predetermined density range defined according to a recordable density range in the recording of the image.

It is also preferable that when provided that the image density of the image to be recorded is denoted by $Di$, an index indicating a degree of the surface roughness of the hard copy is denoted by $S$, the viewed image density after the surface roughness control is denoted by $Density(Di, S)$, $[Density(Di, S)-Di]$ is denoted by $Ds(Di, S)$, and a maximum density recordable by the image recording is denoted by $Dmax$, the surface roughness control can be adjusted to satisfy $[Di \leqq Dmax+Ds(Dmax, S)]$.

Then, still more preferably, provided that a minimum density recordable by the image recording is denoted by $Dmin$, the surface roughness control can be performed to further satisfy $[Dmin+Ds(Dmin, S) \leqq Di]$.

In the step of applying the surface roughness control, the surface roughness may be controlled by forming a rough layer with three-dimensional dots in the image area on the recording medium.

The invention provides a hard copy producing method for producing a hard copy by recording an image on a recording medium according to an image signal which represents an image density of the image to be recorded, comprising the steps of: recording the image on the recording medium according to the image signal; applying a surface roughness control to an image area on the recording medium on which the image is recorded; and adjusting, before applying the surface roughness control of the image area, a rough layer forming signal used for the control according to information on a density difference between an image density before the surface roughness control and a viewed image density after the surface roughness control.

In the adjustment of the a rough layer forming signal, provided that the image density of the image to be recorded is denoted by $Di$, an index indicating a degree of the surface roughness is denoted by $S$, the viewed image density after the surface roughness control is denoted by $Density(Di, S)$, and $[Density(Di, S)-Di]$ is denoted by $Ds(Di, S)$, the rough layer forming signal can be adjusted to set $Ds(Di, S)$ to fall within the predetermined range.

In the step of applying the surface roughness control, the surface roughness can be controlled by forming a rough layer with three-dimensional dots in the image area on the recording medium.

The invention provides a hard copy producing device for producing a hard copy by recording an image on a recording medium according to an image signal which represents an image density of the image to be recorded, comprising: image recording means for recording the image on the recording medium according to the image signal; roughness control means for applying a surface roughness control to an image area on the recording medium according to the image recorded by the image recording means; and correcting means for correcting the image signal before the recording of the image so that a viewed image density provided after the surface roughness control equals the image density of the image to be recorded, according to a previously found density difference between the image density before the surface roughness control and the viewed image density after the surface roughness control.

The roughness control means may control the surface roughness by forming a rough layer with three-dimensional dots in the image area on the recording medium.

The hard copy can be obtained by recording a visible image on a recording medium in accordance with an image signal which represents an image density of the visible image to be recorded, wherein: an area in which the image is recorded has a surface roughness controlled according to the visible image; and the visible image is recorded with the image signal that is corrected in accordance with a density difference between the image density before the control of the surface roughness and the viewed image density after the control of the surface roughness so that a viewed image density provided after the control of the surface roughness equals the image density of the visible image to be recorded.

This application claims priority on Japanese patent application No. 2003-202845, the entire contents of which are hereby incorporated by reference.

BRIEF DESCRIPTION OF THE DRAWINGS

In the accompanying drawings:

FIG. 1 is a block diagram conceptually showing an example of a hard copy producing device according to the present invention;

DESCRIPTION OF THE PREFERRED EMBODIMENTS

A hard copy producing method, a hard copy producing device, and a hard copy according to the present invention are now described in detail referring to preferred embodiments illustrated in the accompanying drawings.

FIG. 1 is a block diagram conceptually showing an example of a printer according to the hard copy producing device of the present invention, which implements the hard copy producing method of the present invention to produce the hard copy of the present invention.

Figure 2A:
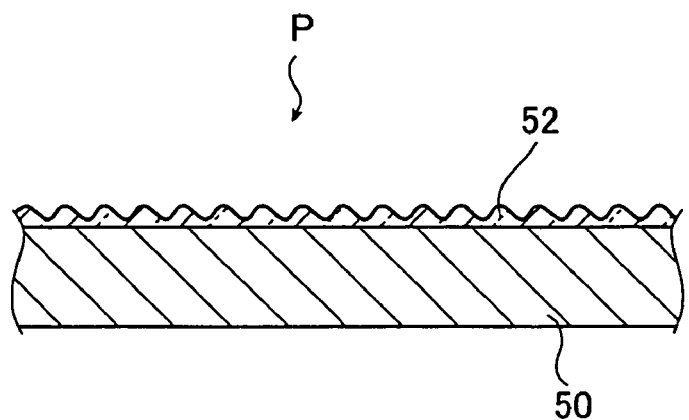
FIGS. 2A and 2B are conceptual diagrams for explaining a high-quality print.

A printer 10 of FIG. 1 makes an inventive print (hard copy) P expressing image texture and three-dimensionality by, as schematically shown in FIG. 2A, recording an image on a recording medium to make a print 50 and then forming a rough layer 52 on its surface to provide irregularities corresponding to the recorded image. Basically, the printer 10 has an image recording unit 12, a rough layer forming unit 14, a roughness-density correcting unit 16, and a rough layer forming signal correcting unit 18.

In the description below, a print having the rough layer 52 formed thereon is referred to as the high-quality print P so that it can be distinguished from the normal print which omits the rough layer 52.

The image recording unit 12 records an image on a recording medium to produce the print 50.

The present invention puts no particular limitation on the image recording unit 12, which can be a photographic printer, a printing device, an ink-jet printer, an electrophotographic printer, various types of image recording device, and so on. That is to say, the present invention places no limitation on the print 50 (hard copy) on which the rough layer 52 is to be formed, which can be prints of various kinds, e.g., a photographic print or printed sheets.

In the printer 10 shown in FIG. 1, an image signal which represents an image density of an image to be recorded is supplied to the roughness-density correcting unit 16 as will be described later and the image recording unit 12 records an image according to the image signal corrected in the roughness-density correcting unit 16 (corrected image signal) to produce the print 50.

As will be described later, the image signal is supplied also to the rough layer forming signal correcting unit 18.

The rough layer forming unit 14 forms, on the surface of the print recorded by the image recording unit 12, the rough layer 52 having surface roughness determined according to the image recorded by the image recording unit 12, whereby the high-quality print P is obtained.

In the high-quality print P, the rough layer 52 is a transparent layer having varying degrees of surface roughness in different areas of the image, depending on the materials of objects in the image recorded on the print 50, the positioning of the objects, and so on.

For example, depending on the objects in the image, an area representing a glossy object made of, e.g., metal or glass, is provided with lower degree of surface roughness (or it can be a smooth surface) and an area representing a less glossy object made of, e.g., wood or cloth, is provided with higher degree of surface roughness. This makes it possible to suitably express the glossiness of objects in the image or the texture of the objects.

Figure 2B:
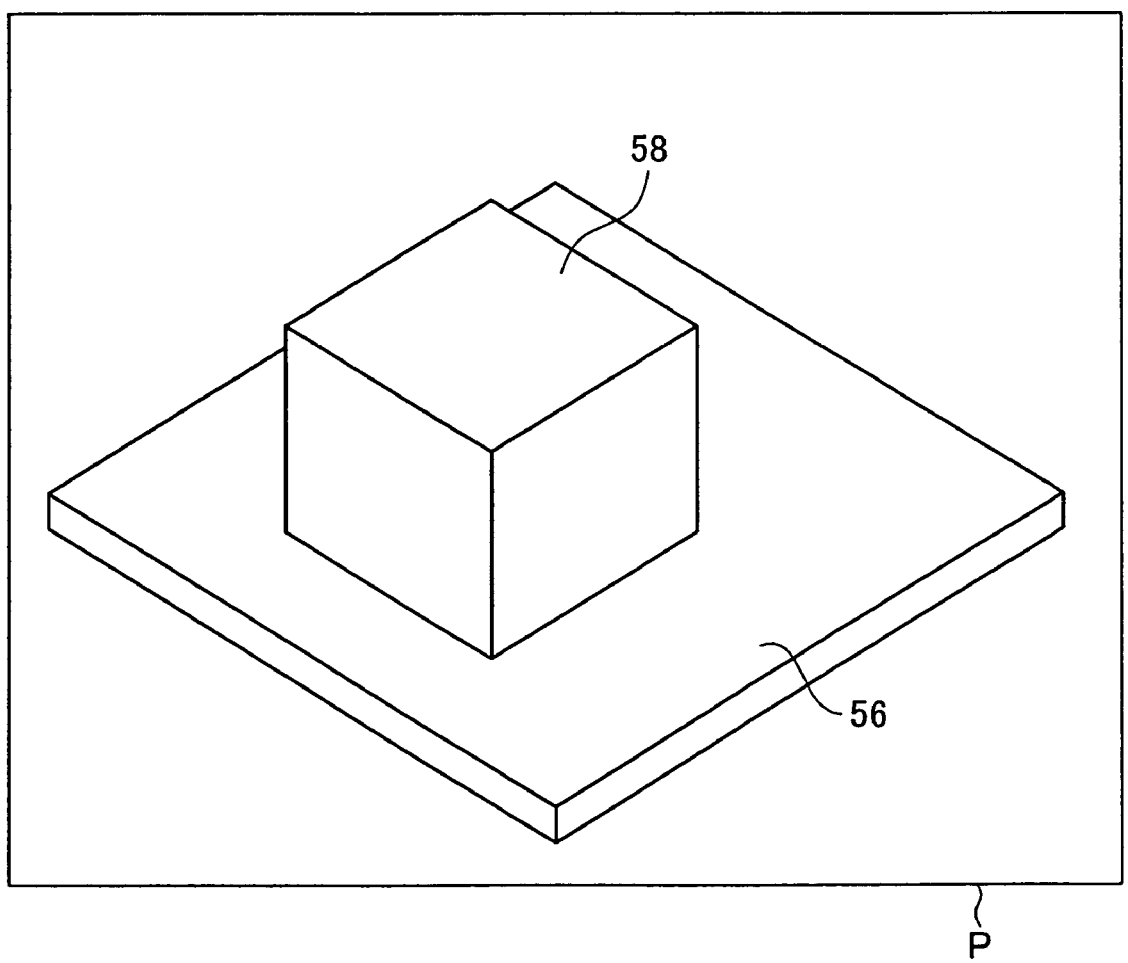

More specifically, as shown in FIG. 2B, with an image in which a metal object 58 is placed on a wood base 56, the high-quality print P is provided with a rough layer 52 having higher degree of surface roughness in the area corresponding to the base 56 and lower degree of surface roughness in the area corresponding to the object 58.

Also, according to the position of objects in the image, when a glossy object is placed nearer to the view point of the image, it is expressed with lower degree of surface roughness, with the remaining area expressed with higher degree of surface roughness. On the other hand, when a less glossy object is placed nearer, it is expressed with higher degree of surface roughness, with the remaining area expressed with lower degree of surface roughness. Thus controlling the local surface roughness of the rough layer to emphasize the texture of a nearer object makes it possible to suitably express the three-dimensionality (depth perception) of the image.

The depth perception can be expressed also by gradually decreasing the degree of texture emphasis in the depth direction, further away from the view point. For example, with the image of FIG. 2B, the rough layer 52 is formed so that, in the area corresponding to the base 56, its surface roughness gradually decreases in the depth direction, further away from the view point, and, in contrast, in the area corresponding to the object 58, the surface roughness is gradually increased in the depth direction further away from the view point.

The method by which the rough layer forming unit 14 forms the rough layer 52 is not particularly limited and various image recording methods can be used.

For example, the rough layer 52 may be formed by ink-jet using transparent ink that does not infiltrate the print 50, in which case irregularities are formed with three-dimensional dots on the surface of the print 50 according to the target surface roughness, followed by a process of hardening the transparent ink (by UV radiation in the case of UV-curing ink, for example). Another suitable method is to form three-dimensional dots on the surface of the print 50 using transparent toner and thermally fix the toner, thus forming irregularities corresponding to the target surface roughness. Also, a transparent coating layer may be formed on the surface of the print 50 and carved with a heated needle to form irregularities corresponding to the target surface roughness. The irregularities can be formed by applying "Millipede", an information recording technique presented by IBM Corporation.

The dimensions (heights and diameters), denseness, etc. of the dots or irregularities to be formed are controlled so that the rough layer 52 on the surface of the print 50 has surface roughness corresponding to individual objects etc. in the recorded image, whereby the high-quality print P is obtained.

In the present invention, for example, the surface roughness of the rough layer is controlled on the basis of arithmetic mean surface roughness Ra, a maximum height Ry, a ten-sample points mean roughness Rz, etc, all of which are defined by JIS B0601 (ISO4287:1997). Alternatively, the surface roughness of the rough layer may be controlled on the basis of the denseness of the surface irregularities, the frequency for forming the irregularities, the formation pattern of irregularities, etc., so as to express the texture of the objects in the image and the three-dimensionality of the image.

Prior to the formation of the rough layer, a protective layer, a gloss layer, a matting layer, etc. may be formed on the surface of the print recorded by the image recording unit 12, in which case the rough layer is formed on the print surface on which such a layer lies.

The rough layer may be formed to cover the entire surface of the print (the entire area of the image recorded surface), or may be formed in at least part of the image, e.g., only in areas corresponding to adequately chosen objects in the image. Moreover, the rough layer itself is not limited to a layer covering the entire area where it is formed, but the underlying surface, e.g., the print surface, may be partially exposed, or a large number of independent concave portions may be formed as irregularities.

As shown in FIG. 1, in the exemplified printer 10, a rough layer forming signal for forming the rough layer 52 is supplied to the rough layer forming signal correcting unit 18, and, as will be described later, is partially corrected as needed. The rough layer forming unit 14 forms the rough layer 52 on the surface of the print 50 in accordance with the corrected rough layer forming signal outputted from the correcting unit 18, so as to produce the high-quality print P. As will be described later, the rough layer forming signal is supplied also to the roughness-density correcting unit 16.

The roughness-density correcting unit 16 corrects the supplied image signal to compensate for variation of image density caused by the formation of the rough layer 52.

In the normal print 50 having no rough layer 52, the density of the image recorded on the print 50 basically matches the density of the image viewed by a viewer (hereinafter referred to as viewed density). When the image recording is properly performed, the image density is a proper density corresponding to the supplied image signal.

However, in the high-quality print P having the rough layer 52, the light is reflected at the surface in a different way from that at the surface of the print 50, which causes apparent density variation when the image is viewed. That is to say, with the high-quality print P, the viewed density differs from the image density recorded on the print 50. Therefore, though the texture is suitably expressed, the image viewed is inadequate because of variations in color/density of the viewed image.

Therefore, the roughness-density correcting unit 16, provided to solve this problem, corrects the image signal on the basis of the rough layer forming signal and the image signal so that the viewed density exhibited after the formation of the rough layer 52 equals the density corresponding to the image signal supplied to the printer 10 (i.e., the image density at which the image recording unit 12 records when the rough layer is not formed=the target image density), and the corrected image signal is supplied to the image recording unit 12.

Further, the roughness-density correcting unit 16 determines whether or not recording is possible at the image density at which the image recording unit 12 performs recording based on the corrected image signal and when recording is not possible at the image density, supplies the corrected image signal to the rough layer forming signal correcting unit 18.

Figure 3A:
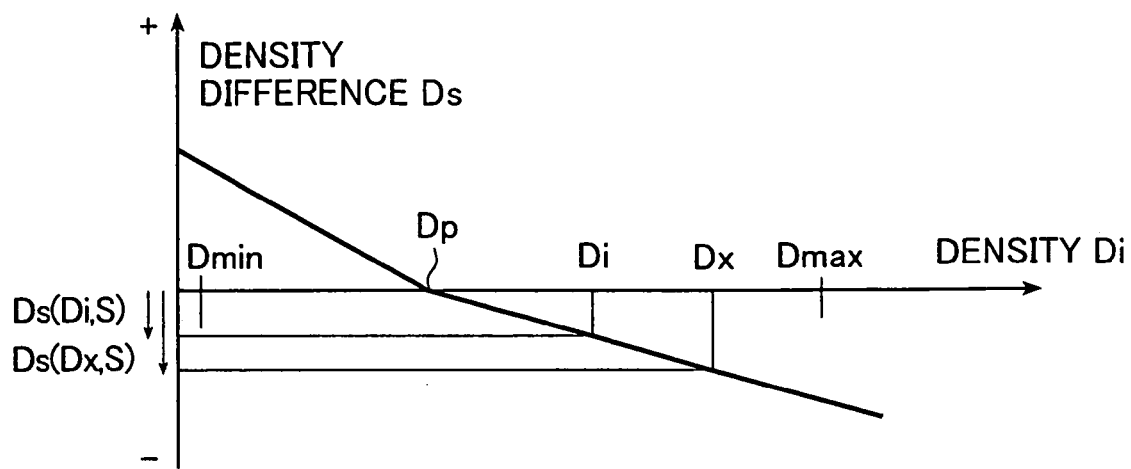
FIGS. 3A to 3C are conceptual diagrams for explaining an example of hard copy production of the present invention.
Figure 3B:
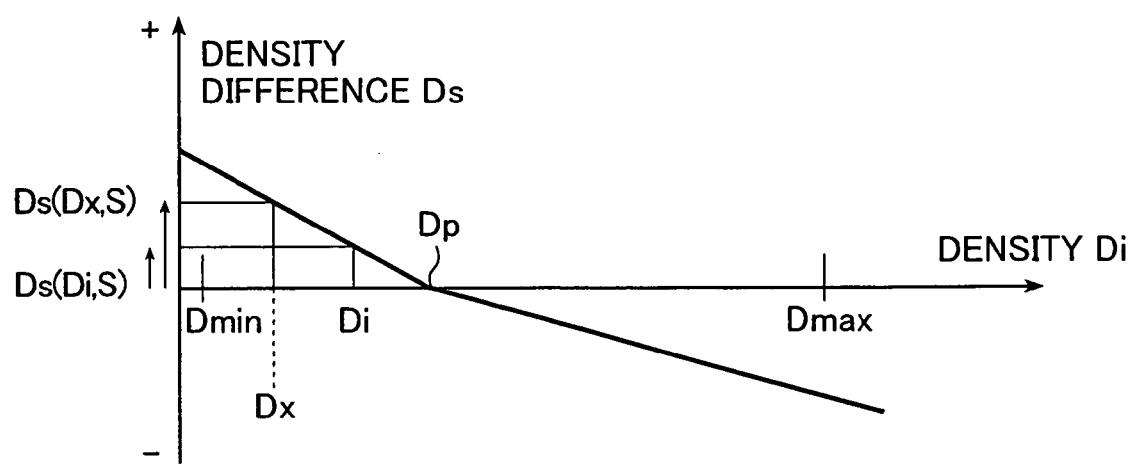

FIG. 3A and FIG. 3B conceptually show examples of the density variation in the presence of the rough layer 52.

Here, Di indicates the image density of the image to be recorded and the density before the formation of the rough layer 52 (before the surface roughness control) and S indicates an index indicating the degree of surface roughness of the rough layer 52, e.g., gloss defined by JIS, ASTM or ISO or a surface roughness Ra. Also, Density(Di, S) indicates the viewed density after the formation of the rough layer 52 with the index S in an area having the image density Di (after the surface roughness control) and Ds(Di, S) indicates the density difference between the image density Di and the viewed density Density(Di, S), i.e., [Density(Di, S)−Di].

With the high-quality print P, the density difference Ds(Di, S) between the image density Di and the viewed density Density(Di, S), caused by the formation of the rough layer 52, varies depending not only on the condition (index S) of the rough layer 52 but also on the image density Di.

Figure 3C:
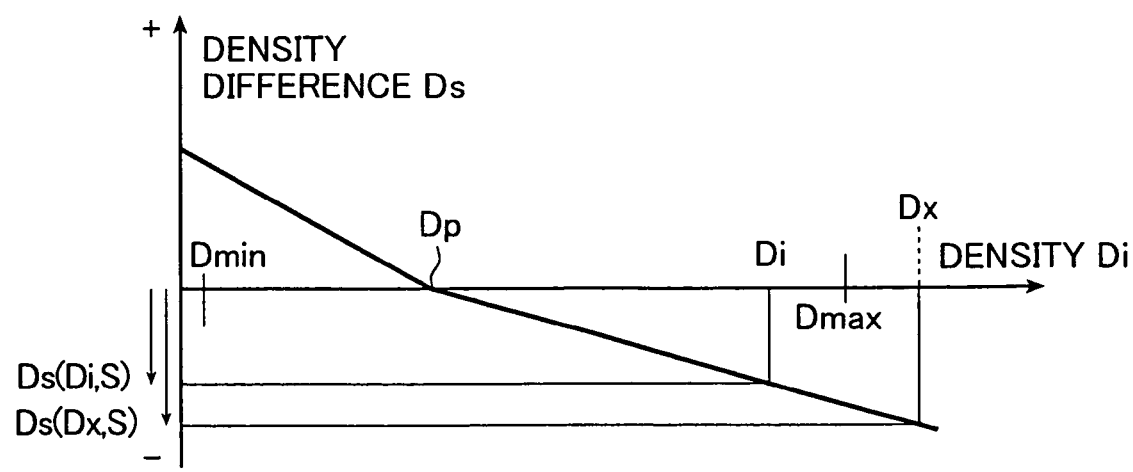

In the examples of FIGS. 3A to 3C, where the horizontal axis shows the image density Di and the vertical axis shows the density difference Ds, the viewed density Density(Di, S) becomes lower below the image density Di at densities higher than the density Dp, and the viewed density Density(Di, S) becomes higher above the image density Di at densities lower than the density Dp.

Now, both in the example of FIG. 3A where the image density Di is equal to or more than the density Dp and the example of FIG. 3B where the image density Di is equal to or less than the density Dp, a viewed density that matches the image density Di or target density based on the image signal can be obtained by recording the image with a density which satisfies the condition that the viewed density Density(Dx, S) (Dx is a variable to be solved) that contains the density difference Ds(Dx, S) equals the image density Di. That is to say, a density Dx that satisfies the formula below is obtained:

$$Di = Dx + Ds(Dx, S)$$

where, more specifically, with a roughness index S, the density Dx is solved and obtained so that the density Dx plus the density difference Ds caused by roughness control with the index S provides a viewed density Density(Dx, S) equal to the image density Di, and the image recording unit 12 records the image with this density Dx.

The roughness-density correcting unit 16 corrects the image signal so that the image recording unit 12 records the image with the density Dx that satisfies the formula Di =Dx+ Ds(Dx, S).

In the illustrated example, a density correction lookup table (LUT) is created and set in the roughness-density correcting unit 16, using the image signal and the rough layer forming signal as parameters, on the basis of the image density Di corresponding to the image signal, the index S corresponding to the rough layer forming signal, and the viewed density Density(Di, S) and the density difference Ds(Di, S) according to the combination of the varying image density Di and index S. Whereby, an image signal (corrected image signal) is obtained which performs recording with the density Dx satisfying the formula Di=Dx+Ds(Dx, S).

By using the density correction LUT, the roughness-density correcting unit 16 obtains the corrected image signal from the image signal and the rough layer forming signal and sends the corrected image signal to the image recording unit 12.

It is not meant to be a limitation that the roughness-density correcting unit 16 corrects the image signal (image density) so that the recording density perfectly agrees with the aforementioned density Dx, but, for example, the density correction LUT may be created so that the density is corrected to a given extent depending on the image quality required for the high-quality print P.

The rough layer forming signal correcting unit 18 corrects the supplied rough layer forming signal as needed and supplies the corrected rough layer forming signal to the rough layer forming unit 14.

As discussed above, with the high-quality print P, the presence of the rough layer 52 causes the density difference Ds (Di, S) between the image density Di recorded by the image recording unit 12 and the viewed density Density(Di, S) by a viewer.

As described so far, in the exemplified printer 10, the roughness-density correcting unit 16 obtains the corrected image signal from the supplied image signal and rough layer forming signal and the image recording unit 12 records the image according to this corrected image signal, so that the viewed density matches the target image density.

However, depending on the combination of the image signal and the rough layer forming signal, i.e., depending on the combination of the image density Di and the index S, as shown in FIG. 3C, the density Dx with which the viewed density Density(Di, S) matches the image density Di may exceed the minimum density Dmin or maximum density Dmax that the image recording unit 12 can record. In other words, the density Dx providing the proper viewed density may be unavailable.

Then, the high-quality print P, when viewed, may exhibit an inadequate image in low- and high-density areas, in which case the image quality is deteriorated, though the image texture may be suitably expressed.

In order to solve this problem, according to a preferred embodiment, the rough layer forming signal correcting unit 18 corrects the rough layer forming signal according to the image signal and the rough layer forming signal.

Specifically, the rough layer forming signal correcting unit 18 corrects the supplied rough layer forming signal to satisfy formulas [Di≦Dmax+Ds(Dmax, S)] and [Dmin+Ds(Dmim, S)≦Di], so as to produce the corrected rough layer forming signal.

The degree of surface roughness of the rough layer 52 is restricted in accordance with the image density Di and the roughness index S so that the formulas above are satisfied, i.e., so that the image density Di is equal to or less than the maximum density Dmax plus the density difference Ds caused by the condition that the image having the maximum density Dmax is controlled with the roughness index S and so that the image density Di is equal to or more than the minimum density Dmin plus the density difference Ds caused by the condition when the image having the minimum density Dmin is controlled with the roughness index S.

Thus, the rough layer forming signal correcting unit 18 does not always correct the rough layer forming signal but it outputs the intact rough layer forming signal as the corrected rough layer forming signal when the image satisfies the two formulas above in each pixel of the image.

In this example, a rough layer correction LUT is created and set in the rough layer forming signal correcting unit 18 to obtain the corrected rough layer forming signal so that the rough layer 52 is formed to satisfy the two formulas above, using the image signal and the rough layer forming signal as parameters, and on the basis of the image density Di corresponding to the image signal, the index S corresponding to the rough layer forming signal, the density difference Ds(Dmax, S) with the combination of the maximum density Dmax and the varying index S, and the density difference Ds(Dmin, S) with the combination of the minimum density Dmin and the varying index S.

The rough layer forming signal correcting unit 18 obtains the corrected rough layer forming signal by using this rough layer correction LUT from the image signal and the rough layer forming signal and sends it to the rough layer forming unit 14.

As has been described so far, with the high-quality print P expressing the texture and three-dimensionality of the image with the rough layer 52 formed on the surface of the print 50 to provide surface roughness determined on the basis of the image, the present invention makes it possible to suitably correct the (apparent) density variation due to the formation of the rough layer and also to suitably express the maximum and minimum densities of the image, thus enabling steady output of the high-quality print P presenting an adequate image when viewed.

According to the example above, as a most preferable embodiment, the rough layer forming signal correcting unit 18 corrects the rough layer forming signal to satisfy both of the formulas about Dmax and Dmin. However, the present invention is not limited to this example.

For example, since lowering the maximum image density causes more serious image quality problems, the rough layer forming signal correcting unit 18 may correct the rough layer forming signal to satisfy only the formula [Di≦Dmax+Ds (Dmax, S)]. With Dmax, or also with Dmin, the formulas for correction are not limited to those shown above, but other formulas may be used to enlarge the permissible range to such an extent that the image quality compensation can be made to satisfy required image quality. For example, the rough layer forming signal correcting unit 18 may correct the rough layer forming signal by using a formula in which Di is multiplied by a coefficient to enlarge the permissible range. In addition, for example, the rough layer forming signal correcting unit 18 may use the formula shown above about Dmax and a formula about Dmin in which Di is multiplied by a coefficient.

Now, the operation of the printer 10 is briefly described.

In the printer 10 shown in FIG. 1, the image signal which represents an image density of an image to be recorded and the rough layer forming signal are supplied to the roughness-density correcting unit 16 and the rough layer forming signal correcting unit 18.

Figure 4A:
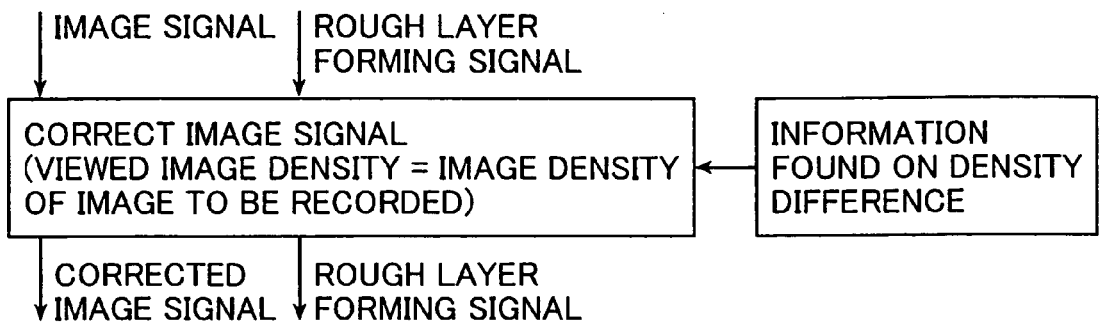
FIGS. 4A to 4C are flow charts each showing the essential part of an example of a hard copy producing method of the present invention.

In this practice, as shown in FIG. 4A, information found on the density difference between the image density before the surface roughness control and the viewed image density after the surface roughness control is used to determine a corrected image density so that the viewed image density after the surface roughness control may equal the image density of an image to be recorded, and a corrected image signal is generated.

Figure 4B:
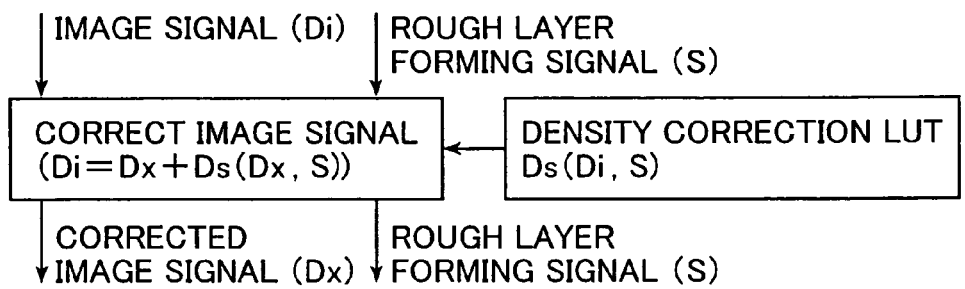

More specifically, as shown in FIG. 4B, the roughness-density correcting unit 16 uses the density correction LUT to determine from the image signal and the rough layer forming signal, the corrected image signal corresponding to the density Dx that satisfies [Di=Dx+Ds(Dx, S)] mentioned above. The density correction LUT may be replaced by the relational expression of the density difference Ds(Di, S) or other function.

Figure 4C:
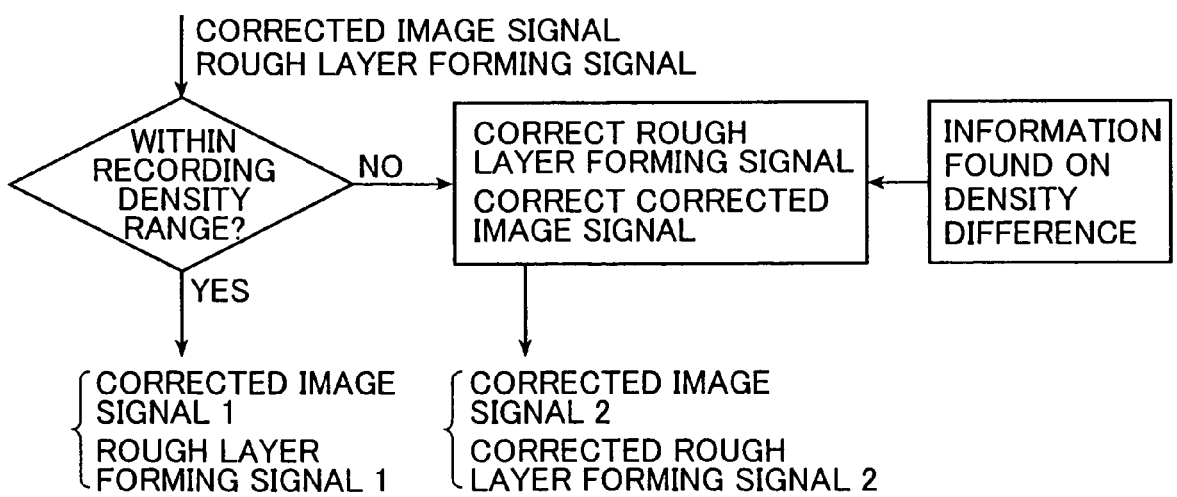

As shown in FIG. 4C, the roughness-density correcting unit 16 also determines whether or not the corrected image density represented by the corrected image signal is the image density at which recording in the image recording unit 12 is possible. When recording is not possible at the corrected image density, the corrected image signal is supplied to the rough layer forming signal correcting unit 18. When recording is possible at the corrected image density to the contrary, the determined corrected image signal and the supplied rough layer forming signal are supplied to the image recording unit 12 and the rough layer forming unit 14 as corrected image signal 1 and corrected rough layer forming signal 1, respectively.

On the other hand, as shown in FIG. 4C, the rough layer forming signal correcting unit 18 uses the roughness correction LUT or other information found on the density difference to correct the corrected image signal and the rough layer forming signal so that the viewed image density after the surface roughness control may equal the image density of the image to be recorded and that the formulas [Di≦Dmax+Ds(Dmax, S)] and [Dmin+Ds(Dmin, S)≦Di] may be satisfied. Corrected image signal 2 and corrected rough layer forming signal 2 obtained as a result of this correction are supplied to the image recording unit 12 and the rough layer forming unit 14, respectively.

The image recording unit 12 records the image according to the supplied corrected image signal (corrected image signal 1 or 2) and outputs the print 50 to the rough layer forming unit 14.

Upon receiving the print 50, the rough layer forming unit 14 forms the rough layer 52 on the surface of the print 50 in accordance with the supplied corrected rough layer forming signal (corrected rough layer forming signal 1 or 2) and outputs the high-quality print P.

In a method like the example above, where the rough layer 52 is formed on the print surface on which an image is recorded so as to produce the high-quality print P, i.e., in a method of controlling the roughness by roughening the surface of the hard copy, the density variation caused by the formation of the rough layer 52 will exhibit a characteristic as shown in FIGS. 3A to 3C in most cases. However, the present invention is not limited to this example but is applicable to production of high-quality prints P using surface roughness control with various characteristics.

Figure 5A:
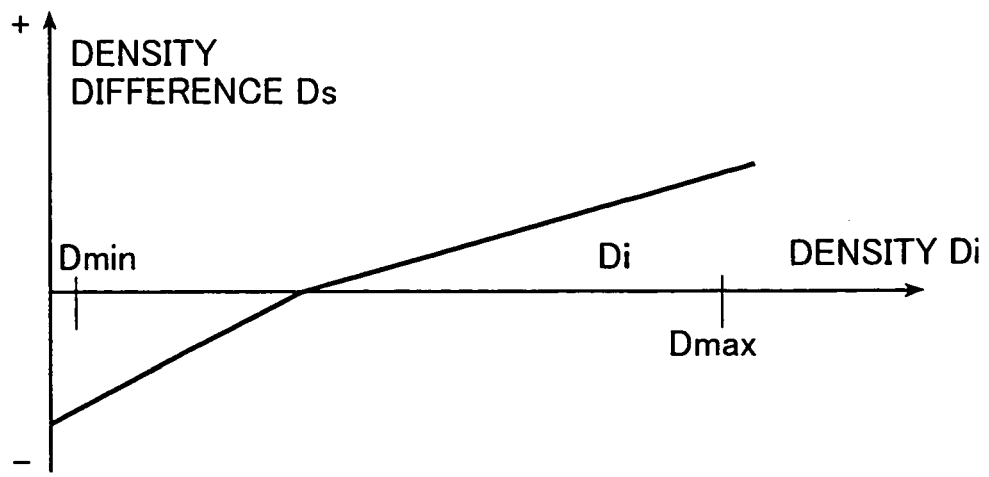
FIGS. 5A to 5C are conceptual diagrams for explaining another example of the hard copy production of the present invention.
Figure 5B:
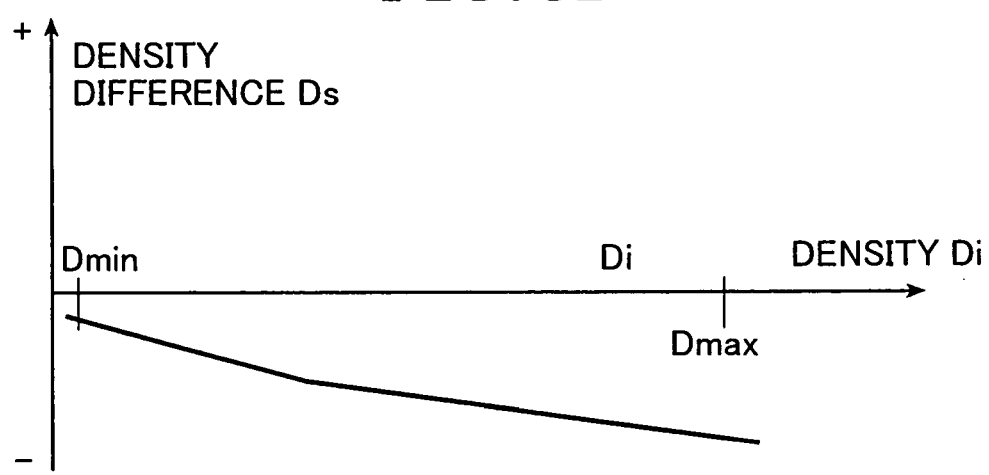
Figure 5C:
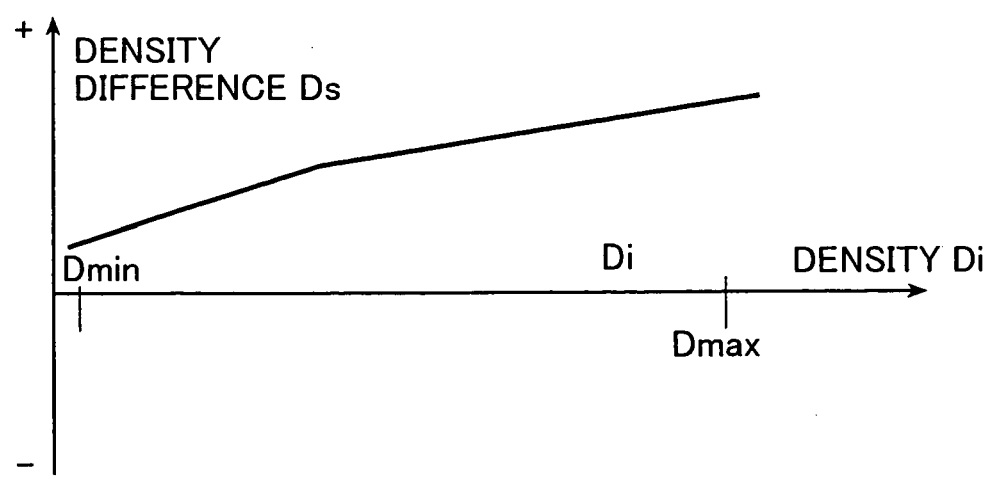

For example, as shown in FIG. 5A, the present invention is applicable to a system having a characteristic in which, in contrast to FIGS. 3A to 3C, the viewed density decreases at lower densities and increases at higher densities, or to a system having a characteristic as shown in FIG. 5B in which the viewed density stays lower than the image density Di at all densities, particularly much lower at higher densities, or to a system having a characteristic as shown in FIG. 5C in which the viewed density stays higher than the image density Di at all densities, particularly much higher at higher densities.

In any systems having any characteristics, thus correcting the image signal and the rough layer forming signal prevents the image quality deterioration corresponding to the viewed density variation due to the rough layer 52 formation (the roughness control), thus providing high-quality print P presenting an adequate image when viewed.

In the present invention, when the high-quality print P reproduces a color image (image recorded by the image recording unit 12), it is preferred, from the viewpoint of the quality of the high-quality print P (image quality and texture), that the correction of the image signal (image density correction) and/or the correction of the rough layer forming signal (roughness degree restriction) be made to satisfy the formulas shown above about all color image signals (densities of C (cyan), M (magenta), and Y (yellow) according to the image signal).

However, the present invention is not limited to this.

For example, the correction may be performed to satisfy the formulas shown above using a mean density of C, M and Y based on the image signal, or values calculated by multiplying an NTSC weighting coefficient, or a sum total or a mean value of values weighted in M>C>Y order.

Alternatively, the correction may be performed to satisfy the formulas shown above about the density or densities of one or two of C, M and Y based on the image signal. In this case, preferably, since M has the largest visual effect, the correction is applied at least to satisfy the formulas about M, and next preferably, the correction is applied to satisfy the formulas about C having the second largest visual effect.

Figure 6:
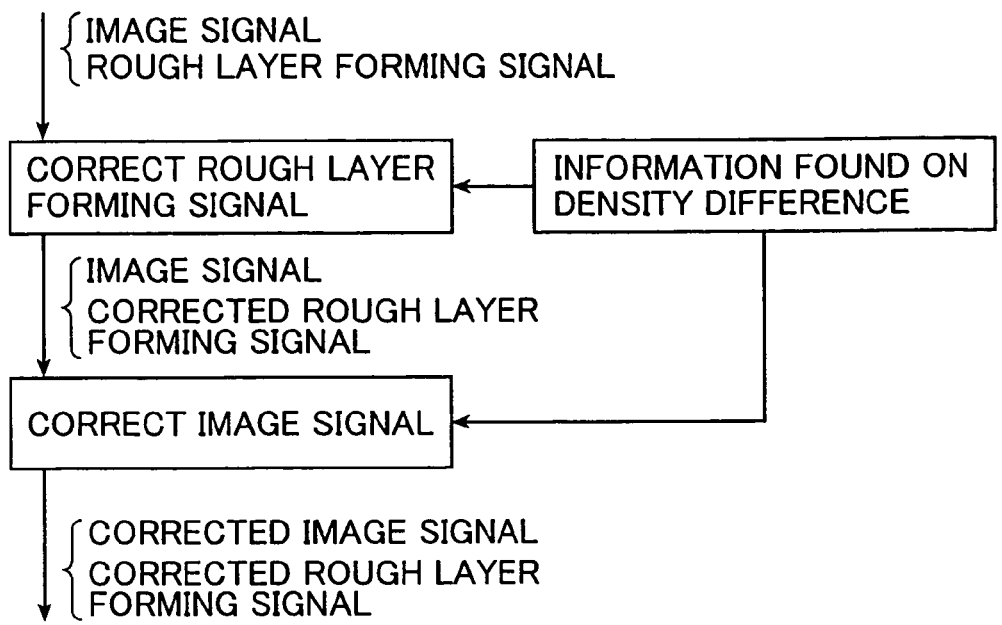
FIG. 6 is a flow chart showing the essential part of another example of the hard copy producing method of the present invention.

In the exemplified printer 10, the image signal (image density) is corrected according to the image signal and the rough layer forming signal, and, in a preferred embodiment, the rough layer forming signal is also corrected according to the image signal and the rough layer forming signal (rough layer restriction), but the correction as shown in FIG. 6A can also be performed.

The rough layer forming signal correcting unit 18 uses information found on the density difference between the image density before the surface roughness control and the viewed image density after the surface roughness control to correct the rough layer forming signal so that the image signal may become a signal representing the image density which falls within the recordable density range (the range where recording is possible at a desired density), and the thus corrected rough layer forming signal is supplied to the roughness-density correcting unit 16, where the image signal can be corrected using the found information based on the corrected rough layer forming signal.

Figure 7:
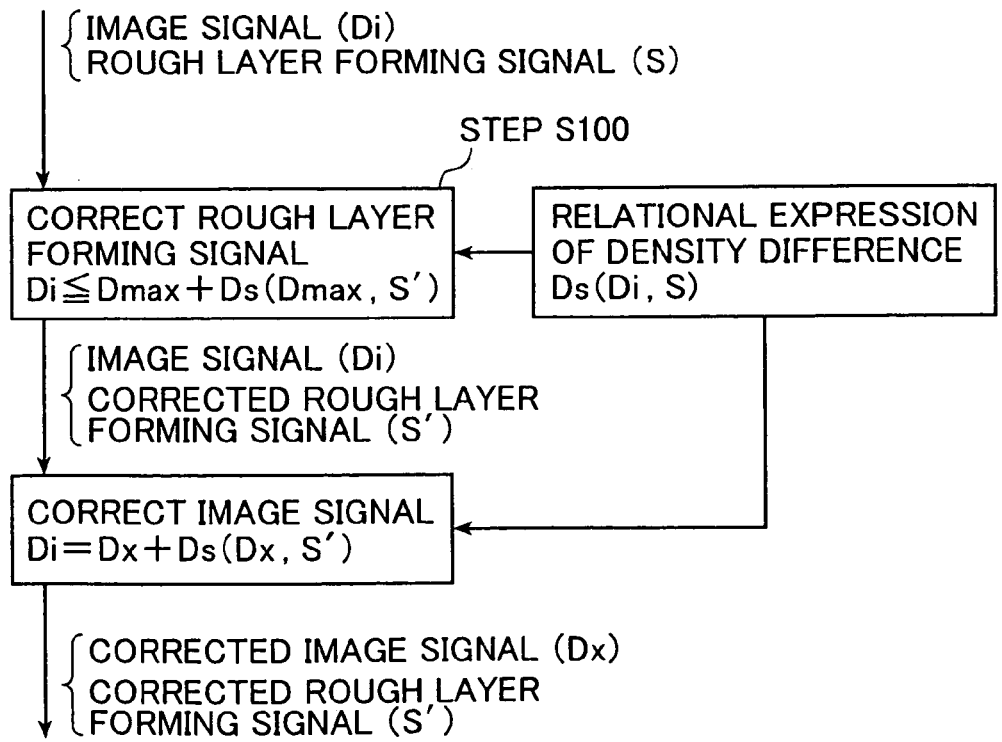
FIG. 7 is a flow chart showing the essential part of still another example of the hard copy producing method of the present invention.

More specifically, as shown in FIG. 7, the rough layer forming signal may be corrected using the relational expression of the density difference Ds(Di, S) so that the maximum density Dmax at which recording is possible satisfies Di≦Dmax+Ds(Dmax, S), and the image signal may be corrected based on the resultant corrected rough layer forming signal (S') also using the above expression of the density difference Ds(Di, S) thereby generating a corrected image density signal (Dx).

Figure 8:
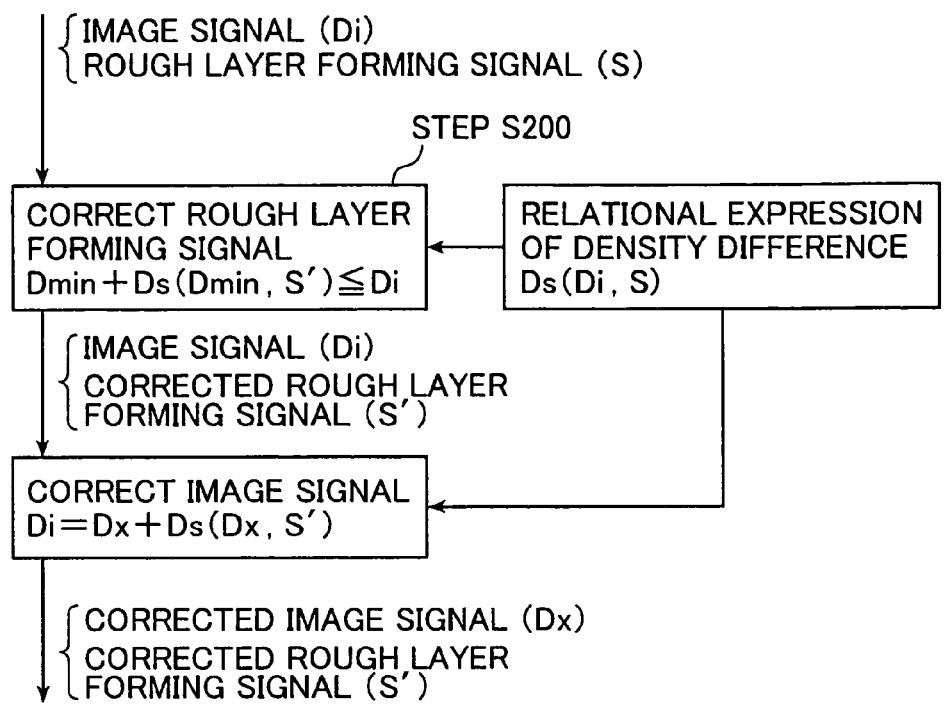
FIG. 8 is a flow chart showing the essential part of yet another example of the hard copy producing method of the present invention.

Further, as shown in FIG. 8, the rough layer forming signal may be corrected using the relational expression of the density difference Ds(Di, S) so that the minimum density Dmin at which recording is possible may satisfy Dmin+Ds(Dmin, S)≦Di, and the image signal may be corrected based on the resultant corrected rough layer forming signal (S') using the above expression of the density difference Ds(Di, S), thereby generating the corrected image density signal (Dx).

Figure 9:
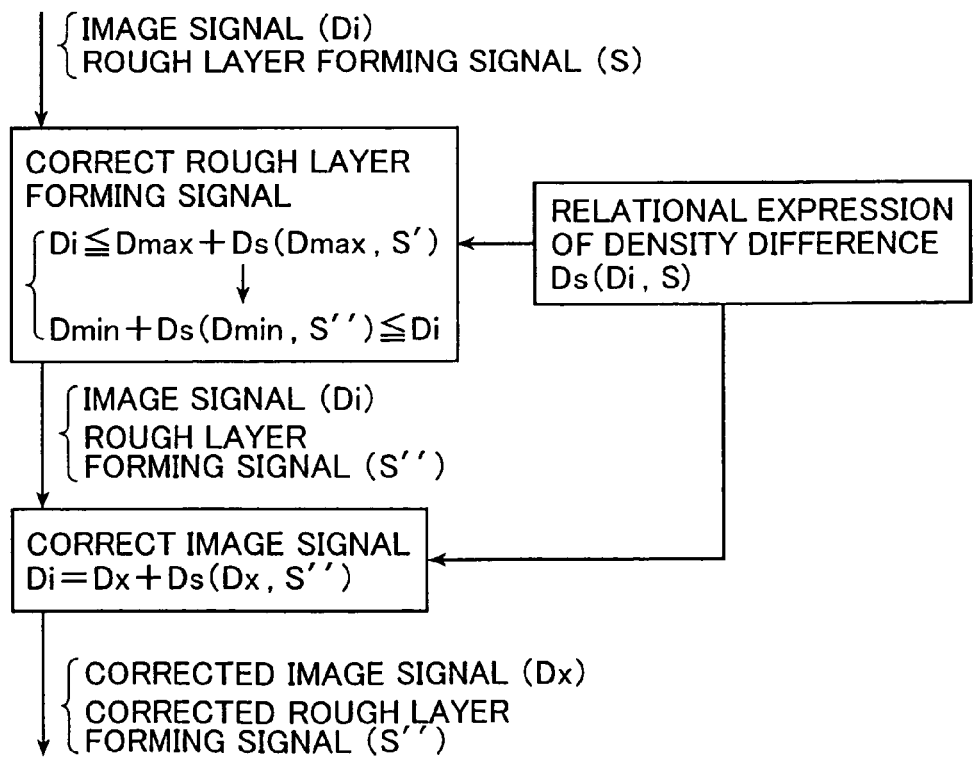
FIG. 9 is a flow chart showing the essential part of yet still another example of the hard copy producing method of the present invention.

Furthermore, as shown in FIG. 9, Step S100 shown in FIG. 7 may be combined with Step S200 shown in FIG. 8 to generate the corrected image density signal (Dx) and the corrected rough layer forming signal (S").

According to another embodiment of the present invention, only the rough layer forming signal may be corrected according to the image signal and the rough layer forming signal, without correcting the image signal.

In this embodiment, although the image quality and texture may be deteriorated as compared with the former embodiment, it is still possible to suitably suppress the image quality deterioration due to the density variation caused by the roughness control. In particular, it is possible to adequately express the maximum density and/or minimum density that considerably affect the image quality, so that the high-quality print P exhibits, when viewed, excellent highlighting and shadowing.

In this case, for example, in the correction of the rough layer forming signal (the rough layer restriction) on the basis of the image signal (the image density Di) and the rough layer forming signal (the index S indicating the degree of roughness), a threshold of the density difference Ds(Di, S) is set and the rough layer forming signal is corrected so that it falls within a given range based on the threshold when this threshold is exceeded. Such a threshold may be set for each of certain density regions. The rough layer forming signal may be corrected as in the rough layer signal correcting unit 18.

While the hard copy producing method, the hard copy producing device, and the hard copy according to the present invention have been described in detail, the foregoing embodiments are meant to be illustrative and not restrictive. It is understood that various other modifications and variations can be devised without departing from the scope of the present invention.

For example, while the printer 10 described herein has both the image recording unit 12 and the rough layer forming unit 14, the present invention is not limited to this configuration and the image recording and the rough layer formation may be performed by separate devices.

Thus, as described above in detail, in the field of hard copies such as photographic prints and printed sheets, the present invention provides a hard copy which suitably expresses glossiness and non-glossiness, texture of materials of objects, e.g., cloth or paper, in the image, three-dimensionality of objects, the depth perception of the image, and so on, and which offers an adequate viewed image density, especially at higher and lower densities.

What is claimed is:

1. A method for producing a hard copy using a hard copy producing device by recording an image on a recording medium according to an image signal which represents an image density of the image to be recorded, comprising the steps of:

recording the image on said recording medium according to the image signal using an image recorder;

applying a surface roughness control, using a surface roughness control device, to an image area on said recording medium on which the image is recorded; and correcting, using a correcting device, before recording the image on said recording medium, the image signal used for the recording so that a viewed image density provided after the surface roughness control equals the image density of the image to be recorded, said correcting using information on a density difference between an image density before the surface roughness control and a viewed image density after the surface roughness control.

2. The method for producing a hard copy using a hard copy producing device, according to claim 1, wherein, in the correction of the image signal, provided that the image density of the image to be recorded is denoted by Di, an index indicating a degree of the surface roughness is denoted by S, the viewed image density after the surface roughness control is denoted by Density(Di, S), and [Density(Di, S)−Di] is denoted by Ds(Di, S), an image density Dx that satisfies [Di=Dx+Ds(Dx, S)] is obtained and the image signal is corrected so as to record the image on said recording medium with the image density Dx.

3. The method for producing a hard copy using a hard copy producing device, according to claim 1, further comprising the step of adjusting the surface roughness control so that the image signal corrected according to the surface roughness control represents an image density within a predetermined density range defined according to a recordable density range in the recording of the image.

4. The method for producing a hard copy using a hard copy producing device, according to claim 3, wherein, provided that the image density of the image to be recorded is denoted by Di, an index indicating a degree of the surface roughness of the hard copy is denoted by S, the viewed image density after the surface roughness control is denoted by Density(Di, S), [Density(Di, S)−Di] is denoted by Ds(Di, S), and a maximum density recordable by the image recording is denoted by Dmax, the surface roughness control is adjusted to satisfy [Di_<=Dmax+Ds(Dmax,S)].

5. The for producing a hard copy using a hard copy producing device, method according to claim 4, wherein, provided that a minimum density recordable by the image recording is denoted by Dmin, the surface roughness control is adjusted to further satisfy [Dmin+Ds(Dmin, S)−Di].

6. The method for producing a hard copy using a hard copy producing device, according to claim 1, wherein, in the step of applying the surface roughness control, the surface roughness is controlled by forming a rough layer with three-dimensional dots in the image area on said recording medium.

7. A method for producing a hard copy using a hard copy producing device by recording an image on a recording medium according to an image signal which represents an image density of the image to be recorded, comprising the steps of:

recording the image on said recording medium according to the image signal using an image recorder;

applying a surface roughness control, using a surface roughness control device, to an image area on said recording medium on which the image is recorded; and adjusting, using an adjusting device, before applying the surface roughness control of the image area, a rough layer forming signal used for the applying according to information on a density difference between an image density before the surface roughness control and a viewed image density after the surface roughness control.

8. The method for producing a hard copy using a hard copy producing device, according to claim 7, wherein, in the adjustment of the a rough layer forming signal, provided that the image density of the image to be recorded is denoted by Di, an index indicating a degree of the surface roughness is denoted by S, the viewed image density after the surface roughness control is denoted by Density(Di, S), and [Density (Di, S)−Di] is denoted by Ds(Di, S), the rough layer forming signal is adjusted to set Ds (Di, S) to fall within the predetermined range.

9. The method for producing a hard copy using a hard copy producing device, according to claim 7, wherein, in the step of applying the surface roughness control, the surface roughness is controlled by forming a rough layer with three-dimensional dots in the image area on said recording medium.

10. A hard copy producing device for producing a hard copy by recording an image on a recording medium according to an image signal which represents an image density of the image to be recorded, comprising:
 image recording means for recording the image on said recording medium according to the image signal;
 roughness control means for applying a surface roughness control to an image area on said recording medium according to the image recorded by the image recording means; and
 correcting means for correcting the image signal before the recording of the image so that a viewed image density provided after the surface roughness control equals the image density of the image to be recorded,
 said correcting means correcting according to a previously found density difference between the image density before the surface roughness control and the viewed image density after the surface roughness control.

11. The hard copy producing device according to claim 10, wherein said roughness control means controls the surface roughness by forming a rough layer with three-dimensional dots in the image area on said recording medium.

12. A hard copy, which is obtained by recording a visible image on a recording medium in accordance with an image signal which represents an image density of the visible image to be recorded, wherein:
 an area in which the image is recorded has a surface roughness controlled according to the visible image; and
 the visible image is recorded with the image signal that is corrected in accordance with a density difference between the image density before the control of the surface roughness and the viewed image density after the control of the surface roughness so that a viewed image density provided after the control of the surface roughness equals the image density of the visible image to be recorded.

* * * * *